(12) United States Patent
Park

(10) Patent No.: US 9,614,856 B2
(45) Date of Patent: Apr. 4, 2017

(54) IMAGE FORMING APPARATUS SUPPORTING PEER-TO-PEER CONNECTION AND ACCESS POINT OPERATION AND METHOD OF CONTROLLING PEER-TO-PEER CONNECTION AND ACCESS POINT OPERATION THEREOF

(75) Inventor: Hyun-wook Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 13/599,245

(22) Filed: Aug. 30, 2012

(65) Prior Publication Data

US 2013/0057912 A1 Mar. 7, 2013

(30) Foreign Application Priority Data

Sep. 2, 2011 (KR) ........................ 10-2011-0089251

(51) Int. Cl.
*G06F 3/12* (2006.01)
*H04M 1/66* (2006.01)
(Continued)

(52) U.S. Cl.
CPC ....... *H04L 63/102* (2013.01); *H04N 1/00347* (2013.01); *H04N 1/00925* (2013.01);
(Continued)

(58) Field of Classification Search
CPC ..... H04W 8/26; H04W 92/18; H04W 76/023; H04W 76/02; H04W 4/08; H04W 84/12;
(Continued)

(56) References Cited

U.S. PATENT DOCUMENTS 7,257,374 B1 8/2007 Creigh
7,463,378 B2 * 12/2008 Williams et al. ............ 358/1.15
(Continued)

FOREIGN PATENT DOCUMENTS

CN 101132617 A 2/2008
EP 2410512 1/2012
(Continued)

OTHER PUBLICATIONS

"Wi-Fi Certified Wi-Fi Direct", Wi-Fi Alliance, Oct. 2010, 14 pages.
(Continued)

*Primary Examiner* — Benny Q Tieu
*Assistant Examiner* — Juan M Guillermety
(74) *Attorney, Agent, or Firm* — Staas & Halsey LLP

(57) ABSTRACT

A method of controlling a peer-to-peer (P2P) connection of an image forming apparatus that supports the P2P connection includes: receiving in the image forming apparatus a P2P connection request from an external wireless device; checking a device type of the wireless device by the image forming apparatus; determining whether the device type corresponds to connection restricted device types; and when the device type is the connection restricted device type, blocking a P2P connection to the wireless device by the image forming apparatus, and when the device type is not the connection restricted device type, P2P connecting the image forming apparatus to the wireless device.

19 Claims, 11 Drawing Sheets

(51) Int. Cl.
*H04L 29/06* (2006.01)
*H04W 12/08* (2009.01)
*H04N 1/00* (2006.01)

(52) U.S. Cl.
CPC ........... *H04W 12/08* (2013.01); *G06F 3/1222* (2013.01); *G06F 3/1236* (2013.01); *G06F 3/1238* (2013.01); *G06F 3/1292* (2013.01); *H04N 1/00204* (2013.01); *H04N 2201/0036* (2013.01); *H04N 2201/0043* (2013.01); *H04N 2201/0046* (2013.01); *H04N 2201/0055* (2013.01); *H04N 2201/0094* (2013.01); *H04N 2201/0096* (2013.01)

(58) Field of Classification Search
CPC ..... H04W 88/08; H04W 8/005; H04W 12/08; H04W 12/06; H04M 1/667; H04M 1/72577; H04N 1/0037; H04N 2201/0094; H04N 2201/3273; H04N 1/00347; H04N 1/00925; H04N 1/4433; H04N 1/00822; H04N 1/00238; H04N 1/0044; H04Q 1/00; G06F 3/1204; G06F 3/1226; G06F 3/1292; G06F 21/608; G06F 21/44; G06F 3/1222; G06F 3/1238; G06F 3/1208; G06F 3/1256; G06F 3/1284; G06K 15/4045; H04L 69/24; H04L 63/102; H04L 63/08; H04L 63/20
USPC ............. 358/1.15, 1.14; 455/41.1, 41.3, 410, 455/556.1, 11.1, 15, 16; 370/315, 327, 370/328, 338
See application file for complete search history.

(56) References Cited

U.S. PATENT DOCUMENTS

| | | | |
|---|---|---|---|
| 7,899,439 B2 * | 3/2011 | Hibino | 455/410 |
| 8,620,305 B2 * | 12/2013 | Singh et al. | 455/424 |
| 8,625,488 B1 * | 1/2014 | Gogate et al. | 370/328 |
| 2003/0156567 A1 | 8/2003 | Oak | |
| 2005/0073521 A1 * | 4/2005 | Watanabe | H04W 8/005 345/440 |
| 2005/0078337 A1 | 4/2005 | Ichikawa et al. | |
| 2005/0277405 A1 * | 12/2005 | Noguchi | H04N 1/00244 455/411 |
| 2006/0130122 A1 * | 6/2006 | Konno | H04W 12/06 726/2 |
| 2007/0086052 A1 * | 4/2007 | Furuya | H04L 67/16 358/1.15 |
| 2007/0271234 A1 * | 11/2007 | Ravikiran | 707/3 |
| 2008/0052710 A1 | 2/2008 | Iwai et al. | |
| 2008/0132202 A1 * | 6/2008 | Kirkup et al. | 455/410 |
| 2008/0137121 A1 | 6/2008 | Chrisop et al. | |
| 2009/0305668 A1 * | 12/2009 | Ahn | H04W 12/06 455/410 |
| 2010/0014111 A1 | 1/2010 | Konno | |
| 2010/0020355 A1 * | 1/2010 | Imai | G06F 21/608 358/1.15 |
| 2010/0069008 A1 * | 3/2010 | Oshima et al. | 455/41.3 |
| 2010/0315668 A1 * | 12/2010 | Aoki | 358/1.15 |
| 2011/0026504 A1 | 2/2011 | Feinberg | |
| 2011/0082940 A1 * | 4/2011 | Montemurro et al. | 709/227 |
| 2011/0085529 A1 | 4/2011 | Choi et al. | |
| 2011/0195747 A1 * | 8/2011 | Ladouceur | 455/556.1 |
| 2011/0321126 A1 * | 12/2011 | Maniatopoulos | H04W 12/08 726/3 |
| 2012/0322368 A1 * | 12/2012 | Desai et al. | 455/41.1 |
| 2013/0027741 A1 * | 1/2013 | Liu | 358/1.15 |
| 2013/0028420 A1 * | 1/2013 | Vikberg | H04W 12/06 455/411 |
| 2013/0036231 A1 * | 2/2013 | Suumaki | H04W 12/04 709/228 |

FOREIGN PATENT DOCUMENTS

| | | |
|---|---|---|
| JP | 2006-163793 | 6/2006 |
| JP | 2006-333247 | 12/2006 |
| JP | 2010-178054 | 8/2010 |
| WO | WO 02/41107 | 5/2002 |
| WO | WO 2008/144520 | 11/2008 |

OTHER PUBLICATIONS

Extended European Search Report dated Dec. 6, 2012, issued from European Patent Application No. 12182400.7.
Extended European Search Report dated Dec. 6, 2012, from European Patent Application No. 12182398.3.
Extended European Search Report dated Dec. 6, 2012, issued from European Patent Application No. 12182412.2.
Extended European Search Report dated Dec. 10, 2012, from European Patent Application No. 12182405.6.
Extended European Search Report dated Dec. 13, 2012, from European Patent Application No. 12182403.1.
PCT Notification of Transmittal of the International Search Report and the Written Opinion of the International Searching Authority or the Declaration, mailed Jan. 31, 2013, issued in corresponding PCT Patent Application No. PCT/KR2012/006976.
"Dynamic Host Configuration Protocol", Wikipedia, Edited Aug. 30, 2011 (12 pages).
Chinese Office Action dated Jan. 5, 2017 in corresponding Chinese Patent Application No. 201210321655.X.

* cited by examiner

FIG. 15

| | SETTING OF RESTRICTED WI-FI DIRECT CONNECTION BY DEVICE TYPE | |
|---|---|---|
| ☐ | ▼ Computer | |
| ☐ |     PC | |
| ☐ |     Server | |
| ☐ |     Media Center | |
| ☐ |     Notebook | |
| ☐ |     Desktop | |
| ☐ |     MID (Mobile Internet Device) | |
| ☑ | ► Input Device | |
| ☑ | ► Printer, Scanner, Faxes and Copiers | |
| ☐ | ► Camera | |
| ☐ | ► Storage | |
| ☐ | ► Network Infrastructure | |
| ☐ | ► Display | |
| ☐ | ► Multimedia Devices | |
| ☑ | ► Gaming Devices | |
| ☐ | ► Telephone | |
| ☑ | ► Audio Devices | |
| ☐ |     Otjers | |

IMAGE FORMING APPARATUS SUPPORTING PEER-TO-PEER CONNECTION AND ACCESS POINT OPERATION AND METHOD OF CONTROLLING PEER-TO-PEER CONNECTION AND ACCESS POINT OPERATION THEREOF

CROSS-REFERENCE TO RELATED APPLICATIONS

This application claims the priority benefit of Korean Patent Application No. 10-2011-0089251, filed on Sep. 2, 2011, in the Korean Intellectual Property Office, the disclosure of which is incorporated herein in its entirety by reference.

BACKGROUND

1. Field

Embodiments relate to an image forming apparatus supporting peer to peer (P2P) connection, and more particularly, to a method of controlling a P2P connection between an image forming apparatus that supports P2P connection and another wireless device.

2. Description of the Related Art

Recently, peer to peer (P2P) communication technology, by which wireless devices may be directly connected to each other without an additional wireless connecting apparatus, have been generalized and widely used. For example, Bluetooth technology makes the P2P communication possible. Although there are limitations in terms of transmission speed and transmission range of Bluetooth, new versions of Bluetooth are being developed to compensate for the limitations.

In addition, Wi-Fi, which is a wireless local area network (WLAN) standard based on IEEE 802.11 regulated by the Wi-Fi alliance is basically a technology using ultra-high speed Internet by accessing access points (APs) connected to an infrastructure network; however, the Wi-Fi may serve the P2P communication by using an ad-hoc function. However, when the ad-hoc function is used, security is weakened, a transmission speed is lowered, and a setting method is not easily performed. Therefore, the Wi-Fi alliance has suggested a Wi-Fi Direct technology that makes the P2P communication possible. The Wi-Fi Direct allows P2P connection between wireless devices without using the AP, supports a transmission speed of a maximum of 250 Mbps, and performs security settings by using Wi-Fi protected access 2 (WPA2), in order to address problems of the ad-hoc function. In addition, the Wi-Fi Direct supports a transmission range of a maximum of 200 m, and thus, is considered as a substitute for the P2P communication.

As described above, with the appearance of the Wi-Fi Direct, it is considered that utilization of the P2P communication is increased more. In addition, the P2P communication technology may be also applied to image forming apparatuses such as printers, scanners, facsimiles, and multi-function printers. Therefore, technologies for user authentication, controlling connections, controlling rights, and managing security are necessary for safely and conveniently using image forming apparatuses supporting the P2P connection.

SUMMARY

Embodiments relate to a method of controlling a peer-to-peer (P2P) connection between an image forming apparatus that supports the P2P connection and other wireless devices.

According to one or more embodiments, there is provided a method of controlling a peer-to-peer (P2P) connection of an image forming apparatus that supports the P2P connection, the method including: receiving in the image forming apparatus a P2P connection request from an external wireless device; checking a device type of the wireless device by the image forming apparatus; determining whether the device type corresponds to connection restricted device types; and when the device type is the connection restricted device type, blocking a P2P connection to the wireless device by the image forming apparatus, and when the device type is not the connection restricted device type, P2P connecting the image forming apparatus to the wireless device.

The image forming apparatus may operate as an access point (AP) that allows clients on a wireless local area network (WLAN) to be connected to each other or operates as a client on the WLAN, and the receiving of the P2P connection request may be performed when the image forming apparatus may operate as the AP.

The determining whether the device type corresponds to the connection restricted device types may be performed with reference to a connection restricted device type database that stores a list of the connection restricted device types.

According to one or more embodiments, there is provided a method of controlling a peer-to-peer (P2P) connection of an image forming apparatus that supports the P2P connection, the method including: searching for wireless devices around the image forming apparatus; checking a device type of a searched wireless device by the image forming apparatus; determining whether the device type of the wireless device corresponds to the connection restricted device type in the image forming apparatus; and displaying a searching result by the image forming apparatus with reference to the determination result.

The displaying of the searching result may include displaying the searching result except for the wireless device, when the device type of the wireless device is the connected restricted device type.

According to one or more embodiments, there is provided an image forming apparatus supporting a peer-to-peer (P2P) connection, the image forming apparatus including: a communication interface unit connecting to an external wireless device in a P2P connection method; and a communication control unit checking a device type of the wireless device when a connection request is transmitted from the wireless device through the communication interface unit, blocking a connection to the wireless device if the checked device type is a connection restricted device type, and connecting to the wireless device in the P2P connection if the checked device type is not the connection restricted device type.

The image forming apparatus may function as an access point (AP) that allows clients on a wireless local area network (WLAN) to be connected to each other or may function as a client on the WLAN, and the communication interface unit may receive the connection request from the wireless device when the image forming apparatus functions as the AP.

The image forming apparatus may further include a connection restricted device type database that stores a list of the connection restricted device types.

The image forming apparatus may further include: a user interface unit receiving a request for changing the connection restricted device type database from a user; and a connection restricted device type setting unit for changing the connection restricted device type database after checking whether the user has an authority to change the database when the user interface unit receives the request for changing the connection restricted device type database from the user.

According to one or embodiments, there is provided an image forming apparatus supporting a peer-to-peer (P2P) connection, the image forming apparatus including: a device searching unit for searching for wireless devices around the image forming apparatus, and checking a device type of a searched wireless device; and a searching result display control unit determining whether the device type of the wireless device corresponds to a connection restricted device type, and displaying the searching result of the wireless device through the user interface unit with reference to the determination result.

The searching result display control unit may not display the wireless device in the searching result, when the device type of the wireless device is the connection restricted device type.

According to an aspect of one or more embodiments, there is provided at least one non-transitory computer readable medium storing computer readable instructions to implement one or more methods of embodiments.

BRIEF DESCRIPTION OF THE DRAWINGS

The above and other aspects will become more apparent by describing in detail embodiments with reference to the attached drawings in which:

FIG. 15 is a diagram showing a user interface screen for setting types of devices that are limited in a Wi-Fi Direction connection, according to an embodiment.

DETAILED DESCRIPTION

Embodiments will now be described more fully hereinafter with reference to the accompanying drawings, in which illustrative embodiments of are shown. However, embodiments may be embodied in many different forms and should not be construed as limited to embodiments set forth herein; rather, these embodiments are provided so that this disclosure will be thorough and complete, and will fully convey the scope of the disclosure to those of ordinary skill in the art. Like numbers refer to like elements throughout.

Hereinafter, a multi-function printer (MFP) that supports Wi-Fi Direct will be described as an example of an image forming apparatus supporting a peer-to-peer (P2P) connection. However, the scope of one or more embodiments to be protected is not limited thereto.

Before describing embodiments, a basic connections and operations of an MFP that supports the Wi-Fi Direct will be described with reference to accompanying drawings.

Figure 1:
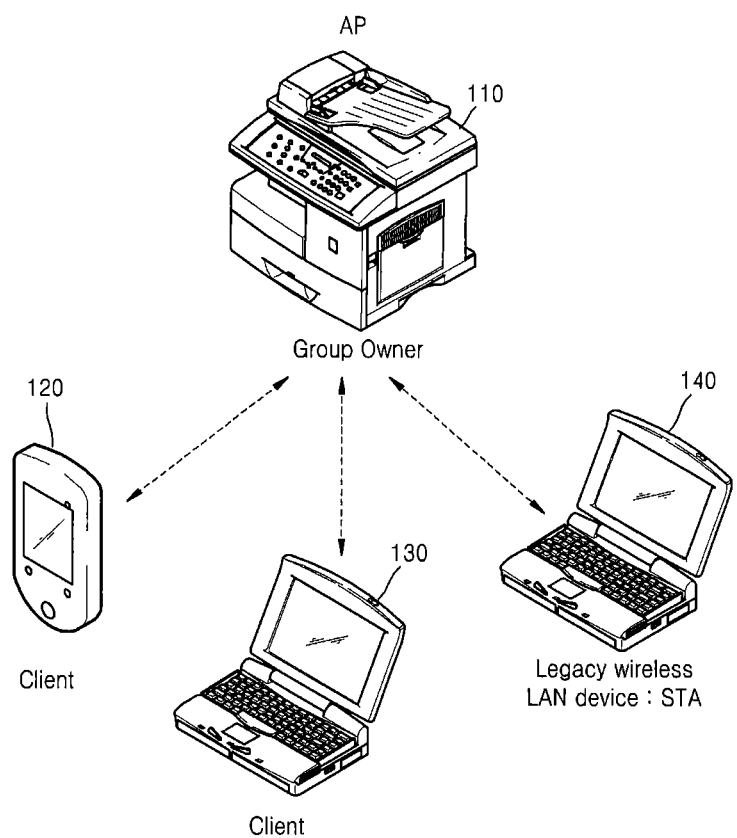
FIG. 1 is a diagram showing devices supporting Wi-Fi Direct and legacy wireless local area network (WLAN) devices that are wirelessly connected to each other to form a wireless network.

FIG. 1 is a diagram showing wireless local area network (WLAN) devices supporting Wi-Fi Direct and a legacy WLAN device connecting to each other to form a wireless network. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 denotes a conventional laptop computer which adopts a WLAN technology and does not support the Wi-Fi Direct.

The WLAN device supporting the Wi-Fi Direct (hereinafter, referred to as "Wi-Fi Direct device") may perform a P2P connection without using an infrastructured network, unlike conventional devices supporting Wi-Fi. In more detail, according to the conventional Wi-Fi technology, a Wi-Fi device is wirelessly connected to a router, that is, an access point (AP), connected to an infrastructured network that is configured in advance in order to form a wireless network. Here, the Wi-Fi devices, which are wirelessly connected to the AP, function as stations. However, according to Wi-Fi Direct technology, one of the Wi-Fi Direct devices that are to form the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without the AP connected to the infrastructured network. In addition, when the wireless network is formed between the Wi-Fi direct devices, the legacy WLAN devices such as the Wi-Fi devices may recognize the Wi-Fi direct device operates as the AP as an AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to the infrastructured network. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes the GO, that is, the Wi-Fi Direct MFP 110, as the AP, and is wirelessly connected to the GO to be connected to the wireless network formed by the Wi-Fi direct devices.

In FIG. 1, the Wi-Fi Direct MFP 110 operates as the GO; however, any one of the other Wi-Fi direct devices, that is, the smartphone 120 and the laptop computer 130, may operate as the GO and the MFP 110 may operate as the client. Which of the Wi-Fi direct devices to become the GO is determined through a negotiation process in Wi-Fi direct connection processes, and this will be described in detail later. In addition, the Wi-Fi direct device may be the GO by itself before the connection without any negotiation, and the Wi-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructure network and may be connected to the AGO.

Although FIG. 1 shows an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the scope of one or more embodiments is not limited thereto, that is, one or more embodiments may be applied to printers, scanners, or facsimiles supporting the Wi-Fi Direct. In addition, the Wi-Fi Direct is used as an example of the P2P communication method; however, other kinds of P2P communication such as Bluetooth and Zigbee may be used.

Figure 2:
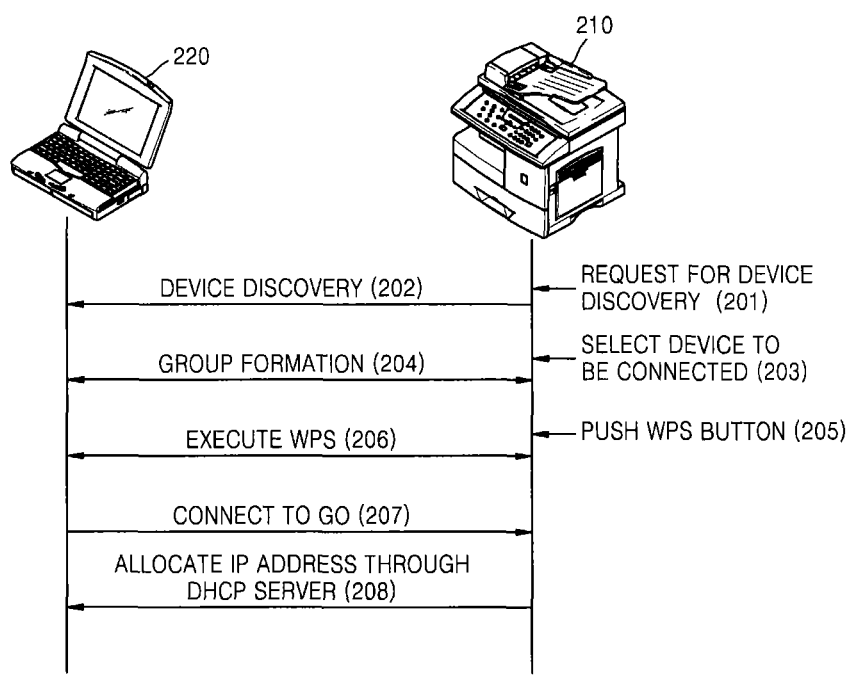
FIG. 2 is a diagram showing processes of wirelessly connecting the devices supporting the Wi-Fi Direct to each other.

FIG. 2 is a diagram showing processes of wirelessly connecting Wi-Fi Direct devices to each other. In more detail, processes of Wi-Fi Direct connection between a Wi-Fi Direct MFP 210 and a Wi-Fi Direct laptop computer 220 are shown. The Wi-Fi Direct connecting processes may be divided as a device discovery process, a group formation process, and a secure connection process. Referring to FIG. 2, the Wi-Fi Direct MFP 210 receives a request for device discovery from a user (201), and searches for a Wi-Fi Direct device around it (202). The device discovery request may be input through a user interface of the MFP 210, for example, a user interface realized on a display unit such as a liquid crystal display (LCD) formed in the MFP 210. If it is determined as a result of searching that there is a Wi-Fi Direct device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there is a plurality of Wi-Fi Direct devices, the MFP 210 displays a list of the searched Wi-Fi direct devices on the display unit so that the user may select one of the Wi-Fi direct devices and request the connection to the selected Wi-Fi direct device.

After receiving the connection request 203, a group formation is performed between the Wi-Fi Direct devices to be connected (204). The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. The user pushes a WPS button provided on the MFP 210 to request the secure connection (205). In addition, within a predetermined period of time (in general, 120 seconds), the secure connection may be achieved by pushing a WPS button formed on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks the WPS button represented on the display unit of the laptop computer 220 by using a mouse, for example, to request the secure connection. When the security connection is requested by pushing the WPS button, the device that is determined to be the GO in the group formation process transmits security information to devices determined as the clients (206). According to the Wi-Fi Direct, the secure connection is executed after encrypting in a Wi-Fi protected access 2 (WPA2)-pre-shared key (PSK) method, and thus, the Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO (207). At this time, the Wi-Fi Direct device that is the GO automatically allocates an Internet protocol (IP) address to the Wi-Fi direct device that is the client by using a dynamic host configuration protocol (DHCP) server (208), and then, the P2P connection between the Wi-Fi Direct devices is completed.

Basic processes for connecting the Wi-Fi direct devices have been described so far, and detailed processes and characteristics of the Wi-Fi Direct technology will be described with reference to the accompanying drawings as follows.

Figure 3:
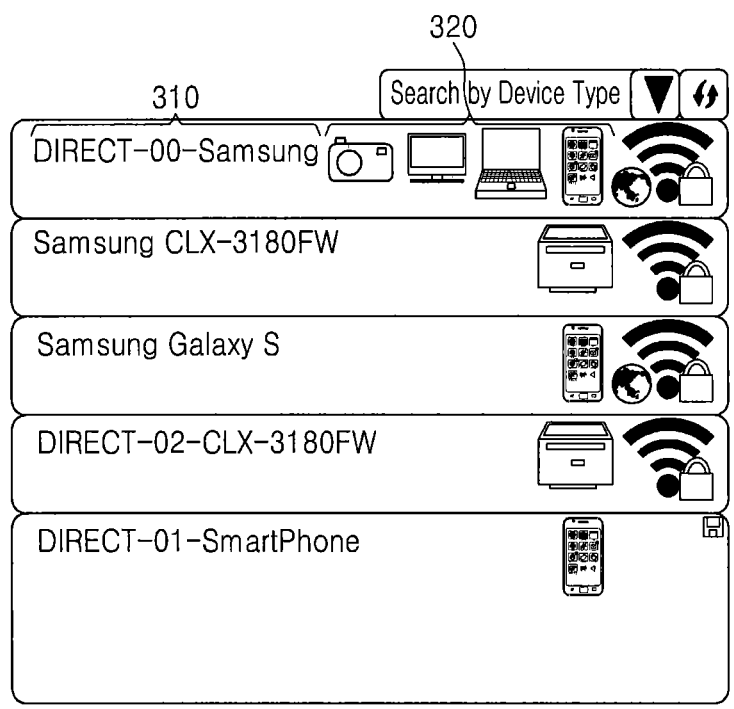
FIG. 3 is a diagram showing an example of displaying a list of Wi-Fi Direct devices that are found after a device discovery process performed by a device supporting the Wi-Fi Direct.

FIG. 3 is a diagram showing an example of displaying a list of the Wi-Fi Direct devices that are searched in the device discovery process in the Wi-Fi Direct device. When the device discovery process is performed by the Wi-Fi direct device, device information such as a type of the device and a service set identifier (SSID) of the device is exchanged between the devices through a probe request and a probe response that are WLAN packets, and the Wi-Fi direct device that performs the device discovery process displays the collected information. As shown in FIG. 3, the SSIDs and the types of the searched Wi-Fi Direct devices are represented as text (310) or icons (320). Here, all of the searched devices may be represented in the list; however, the devices may be filtered so that the devices of a desired type may be only displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
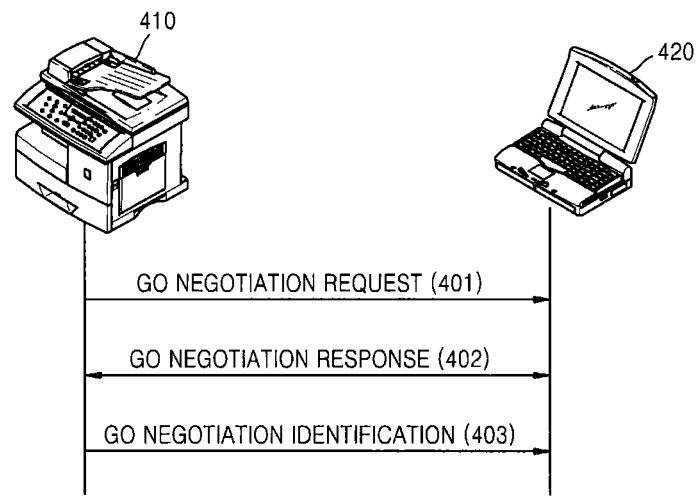
FIG. 4 is a diagram showing a group formation process in the processes of connecting the Wi-Fi Direct supporting devices to each other.

FIG. 4 is a diagram showing the group formation process in detail among the connecting processes between the Wi-Fi Direct devices. The group formation process is a process for determining the Wi-Fi Direct devices that are to form a network, and the Wi-Fi Direct devices to be the GO and the clients. For example, when the Wi-Fi direct MFP 410 performs the device discovery and selects a laptop computer 420 among the discovered Wi-Fi Direct devices to be connected, the MFP 410 transmits a GO negotiation request to the laptop computer 420 (401). The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. Here, the intent value is a value representing a degree of task intent in each device, and is determined by manufacturer policy and user settings. The intent value of the device, which is supplied power always, may be set to be relatively high. As described above, after determining the Wi-Fi Direct device to be the GO by comparing the intent values, the laptop computer 420 transmits the determination result to the MFP 410 as a response to the GO negotiation (402). The MFP 410 that receives the determination result transmits an acknowledgement to the laptop computer 420 (403) in order to verify the receipt of the negotiation, and then, the group formation process is finished. When the group formation is completed, the Wi-Fi Direct device that is the GO manages security information and SSIDs of the other Wi-Fi Direct devices included in the group.

Figure 5:
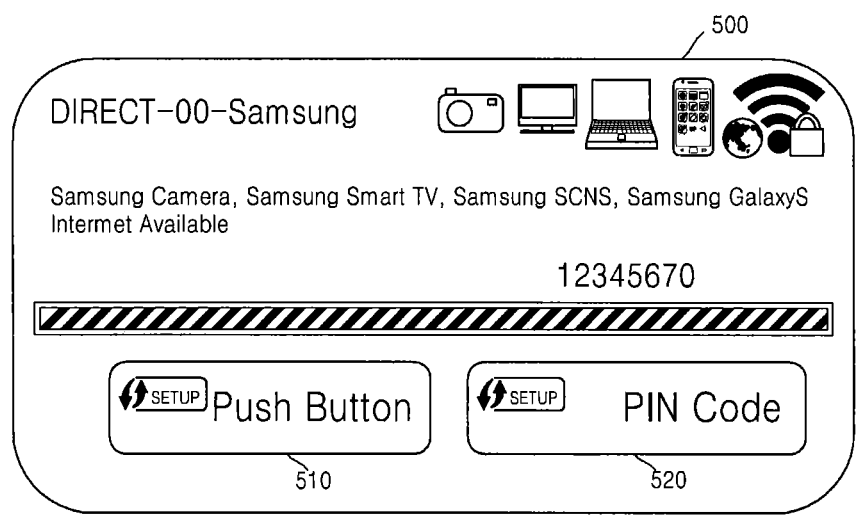
FIG. 5 is a diagram showing a display screen for executing WPS.

When the group is formed, the Wi-Fi Direct devices included in the group are securely connected to each other through the WPS. FIG. 5 is a diagram showing a display screen 500 for executing the WPS. The screen of FIG. 5 may be displayed on a display unit of the Wi-Fi Direct MFP. Referring to FIG. 5, the user may select one of a WPS button 510 and a PIN code 520 for executing the WPS. When the WPS is executed through the WPS button 510, the WPS button 510 of the Wi-Fi Direct MFP is pushed and WPS buttons of other devices are pushed within a predetermined period of time, and then, security information is exchanged between the devices automatically and the secure connection is made. Here, the Wi-Fi Direct device that is the GO provides security information to the Wi-Fi direct devices that are the clients. In addition, the secure connection is performed after encrypting in the WPA2-PSK verification method, and thus, high security may be achieved.

Figure 6:
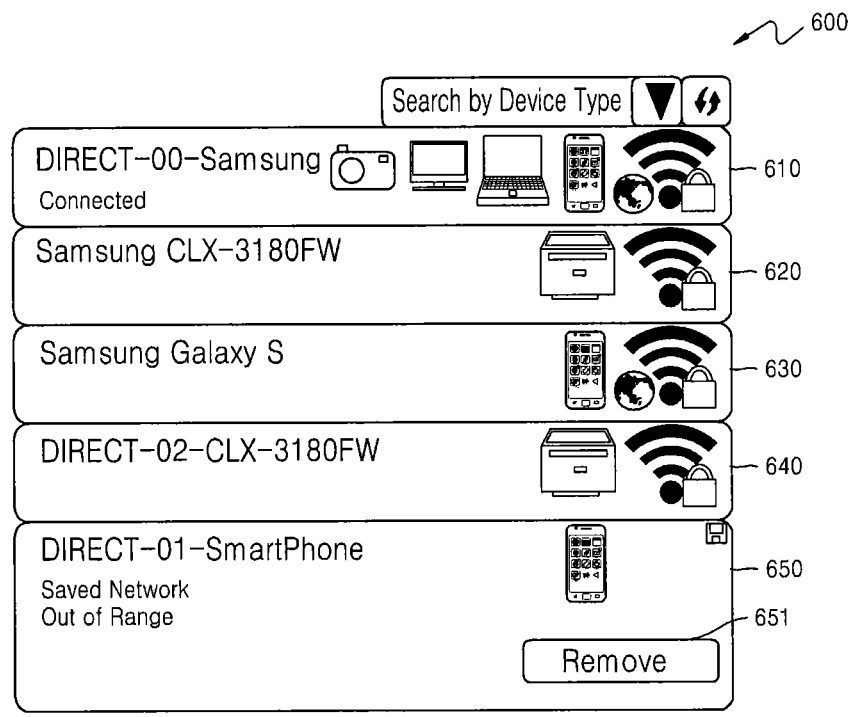
FIG. 6 is a diagram showing a list of devices, information of which is stored, supporting Wi-Fi Direct according to a profile storing function.

The Wi-Fi Direct devices have a profile storage function that is for storing information of the Wi-Fi Direct devices connected once thereto. FIG. 6 is a diagram showing a list of the Wi-Fi Direct devices, information of which is stored according to the profile storage function. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing a remove button 651. Since the Wi-Fi direct device has the profile storage function as described above, the Wi-Fi Direct device stores information of the other Wi-Fi Direct devices connected at least once thereto, and then, may be connected fast without executing the WPS by using the stored information in a case where the same device tries to connect thereto again.

Figure 7:
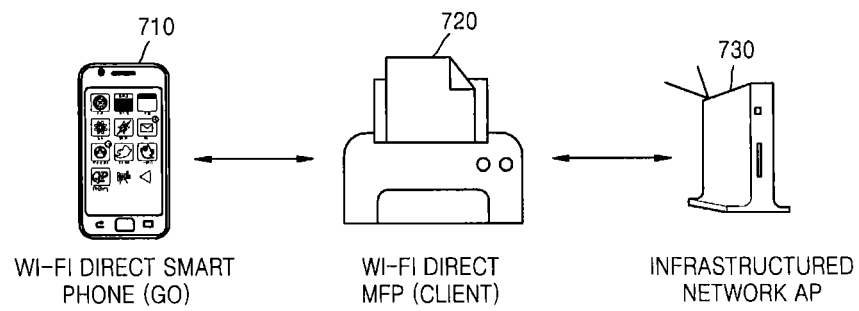
FIG. 7 is a diagram showing Wi-Fi Direct supporting devices that are simultaneously connected to each other.

The Wi-Fi Direct device may be P2P connected to another Wi-Fi direct device, and at the same time, may be connected to the infrastructured network, which is referred to as a concurrent connection. FIG. 7 is a diagram showing the Wi-Fi Direct devices that are in the concurrent connection states. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as shown in FIG. 7, or when the Wi-Fi Direct device is wired connected to the infrastructured network and P2P connected to another Wi-Fi direct device, different IP addresses and MAC addresses with respect to the connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
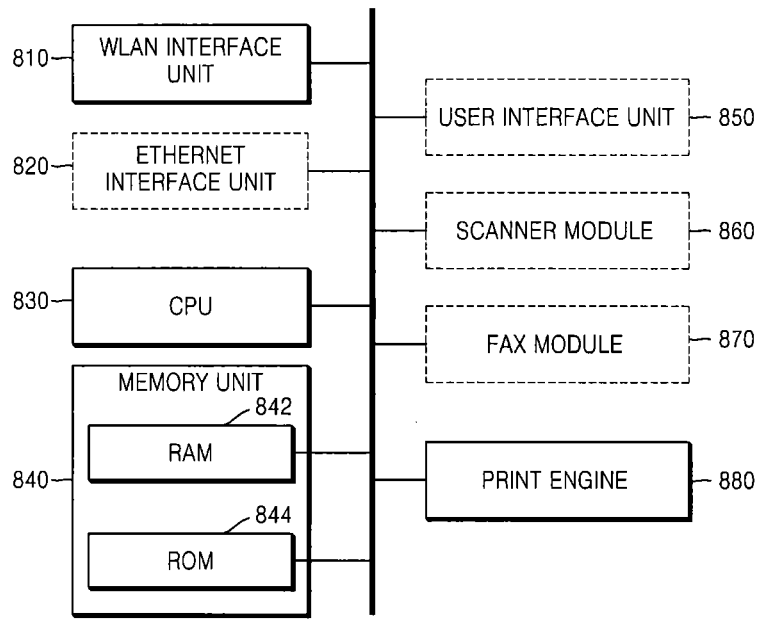
FIG. 8 is a block diagram showing a hardware configuration of a multi-function printer supporting the Wi-Fi Direct according to an embodiment.

FIG. 8 is a block diagram showing a hardware configuration of the Wi-Fi Direct MFP. Referring to FIG. 8, the Wi-Fi Direct MFP may include a WLAN interface module 810, an Ethernet interface module 820, a central processing unit (CPU) 830, a memory unit 840, a user interface module 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware performing IEEE 802.11b/g/n function, and may communicate with a main board, on which the CPU 830 is mounted, of the MFP via a universal serial bus (USB). The Ethernet interface module 820 is hardware for performing wired Ethernet communication according to IEEE 802.3. The CPU 830 controls overall operations of the MFP, and the memory unit 840 stores information for controlling the MFP and the print data to be read when it is necessary. The user interface module 850 functions as a medium for the user to identify information of the MFP and to input commands into the MFP. The user interface module 850 may be variously modified according to products, for example, may be configured as two or four lines displayed on a display unit such as an LCD or a light emitting diode (LED), or may be realized as a graphic user interface (UI) so as to represent various graphics. The scanner module 860, the fax module 870, and the print engine 880 are hardware for performing functions of a scanner, a facsimile, and a printer.

Figure 9:
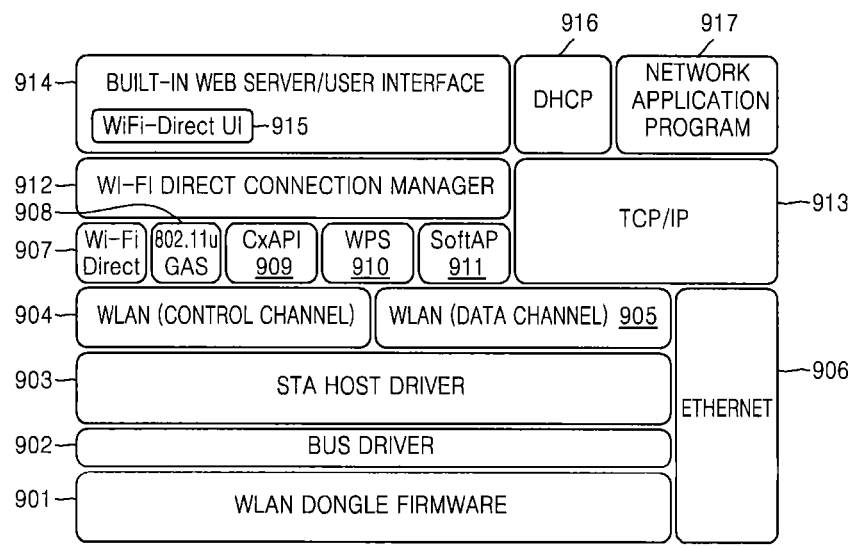
FIG. 9 is a block diagram showing a software configuration of the multi-function printer supporting the Wi-Fi Direct of FIG. 8.

FIG. 9 is a block diagram showing software configuration of the Wi-Fi Direct MFP. The configuration of the software in the Wi-Fi Direct MFP will be described with reference to FIG. 9 as follows.

A WLAN dongle firmware 901 is a firmware for connecting the WLAN, and may be stored in WLAN dongle hardware or may be transmitted to the WLAN dongle hardware from a main board of the MFP when booting the MFP. A bus driver 902 and a station (STA) host driver 903 are low level bus drivers for communicating with the WLAN hardware. A WLAN controlling channel 904 and a WLAN data channel 905 are channels for communicating with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, and a WPS module 910 performs a WPS function. A soft AP module 911 is a software module allowing the MFP to perform as the AP. A transmission control protocol (TCP)/IP 913 is a standard protocol for network transmission. A Wi-Fi Direct connection manager 912 is a module for controlling the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP to the Wi-Fi Direct device that is connected as a client. A network application program 917 performs various application operations relating to the network.

The above-described Wi-Fi Direct technology has the following advantages.

The Wi-Fi Direct device may be connected to other devices whenever and wherever, and thus, has maximum mobility and portability. If a new Wi-Fi Direct device is added, the Wi-Fi Direct device may be directly connected to the new Wi-Fi direct device. In addition, it may be identified whether there is an available device or service before setting the connection to other devices, and thus, the Wi-Fi direct devices may be conveniently used. In addition, the connection may be performed simply and stably by a simple operation, for example, pushing a WPS button, and the connection may be performed with high security functions by using the WPA2 technology.

In addition, the Wi-Fi Direct technology may provide various functions that may not be provided by the conventional WLAN technology.

For example, the device discovery function for searching for peripheral Wi-Fi Direct devices by the device type unit, the service discovery function that may search for services provided by the peripheral Wi-Fi Direct devices, a power management function that may effectively use electric power, the concurrent connection function that may form the P2P connection between the Wi-Fi Direct devices while connecting to the conventional infrastructured network, a function of separating a security domain between the infrastructured network connection and the Wi-Fi Direct connection, and a cross connection function for sharing an Internet connection may be provided by the Wi-Fi Direct technology.

In addition, since the Wi-Fi Direct technology is based on the conventional WLAN technology, that is, IEEE 802.11, the Wi-Fi Direct devices may be compatible with conventional legacy WLAN devices.

Hereinafter, a method of controlling a P2P connection of a Wi-Fi Direct MFP according to an embodiment will be described in detail with reference to FIGS. 10 through 15.

Figure 10:
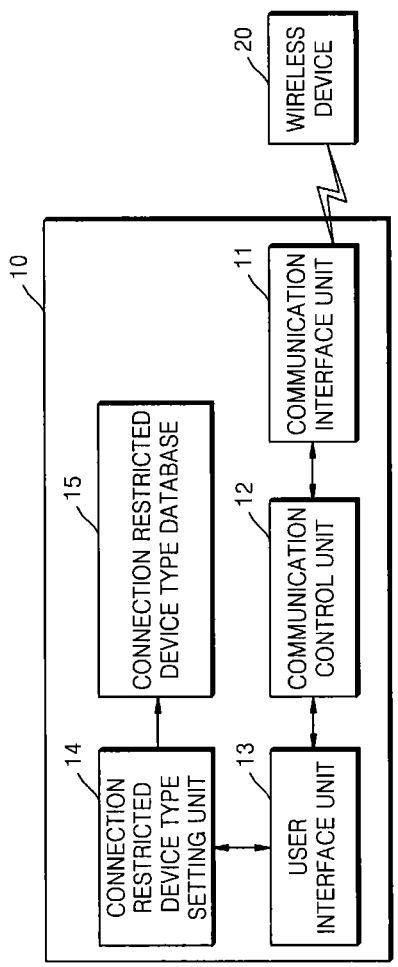
FIG. 10 is a block diagram of a detailed configuration of the multi-function printer supporting the Wi-Fi Direct, shown in FIG. 8.

FIG. 10 is a block diagram of a Wi-Fi Direct MFP 10 according to an embodiment. Featured components, which are necessary in executing the method of managing the address list, of the Wi-Fi Direct MFP 10 are only shown in FIG. 10 under the assumption that the basic hardware configuration of the Wi-Fi Direct MFP shown in FIG. 8 is included in the Wi-Fi Direct MFP 10. For example, a communication interface unit (communication interface) 11 of FIG. 10 corresponds to the WLAN interface unit 810 of FIG. 8, and a communication control unit (communication controller) 12 corresponds to a part for controlling communications in the CPU 830 of FIG. 8. A user interface unit (user interface) 13 of FIG. 10 corresponds to the user interface unit 850 of FIG. 8, a connection restricted device type setting unit 14 of FIG. 10 is included in the CPU 830 of FIG. 8, and a connection restricted device type database 15 of FIG. 10 is a space for storing a list of connection restricted device types in the memory unit 840 of FIG. 8. Besides, basic components of the MFP such as the print engine 880, the fax module 870, and the scanner module 860 shown in FIG. 8 are not shown in FIG. 10.

Referring to FIG. 10, the Wi-Fi Direct MFP 10 of an present embodiment may include the communication interface unit (communication interface) 11, the communication control unit (communication controller) 12, the user interface unit (user interface) 13, the connection restricted device type setting unit 14, and the connection restricted device type database 15. Functions and operations of the components in the Wi-Fi Direct MFP 10 will be described in more detail as follows.

Figure 11:
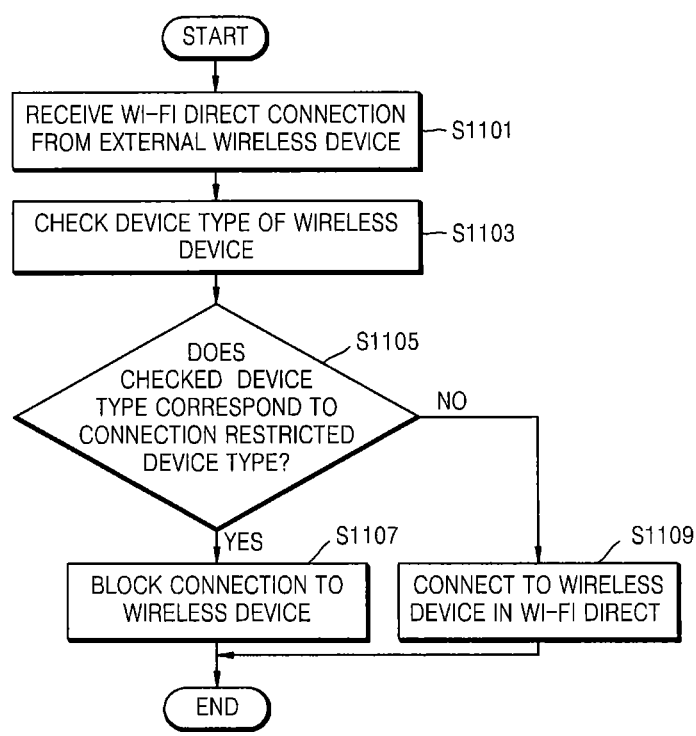
FIGS. 11 and 12 are flowcharts illustrating a method of controlling the P2P connection of a multi-function printer supporting the Wi-Fi Direct, according to an embodiment.
Figure 12:
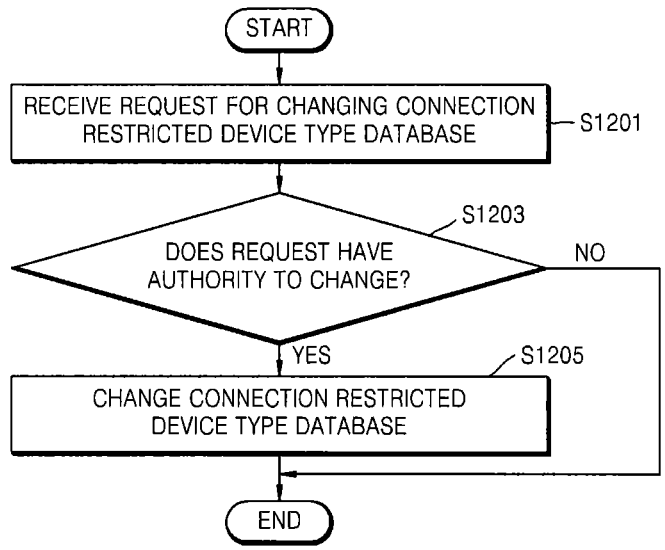

FIGS. 11 and 12 are flowcharts illustrating a method of controlling a P2P connection of the Wi-Fi Direct MFP according to an embodiment.

Referring to FIG. 11, the communication interface unit (communication interface) 11 of the MFP 10 receives a Wi-Fi Direct connection request from an external wireless device 20 (S1101). On receiving the connection request, the communication control unit (communication controller) 12 checks a device type of the wireless device 20 that transmits the connection request (S1103). The device type may be identified by using a device discovery function of the Wi-Fi Direct. After identifying the device type of the wireless device 20, the communication control unit 12 determines whether the device type of the wireless device 20 included in connection restricted device types, with reference to the connection restricted device type database 15 (S1105). Here, the connection restricted device type database 15 stores device types of connection restricted devices. If the device type of the wireless device 20 corresponds to the connection restricted device types, the connection to the wireless device 20 is disconnected (S1107). If the device type of the wireless device 20 does not corresponds to the connection restricted device types, the Wi-Fi Direct MFP 10 is Wi-Fi direct connected to the wireless device (S1109). If the connection to the wireless device 20 is disconnected, the disconnection may be notified to the user by recording the disconnection in a system log or displaying a message on the user interface 13.

As described above, if the wireless device is not expected to provide services even when the wireless device is P2P connected to the MFP or if the wireless device is the device type that is irrelevant with the objective of the user, the P2P connection between the MFP 10 and the wireless device 20 is restricted in order to prevent unnecessary resource consumption of the system and prevent the necessary connection from being limited due to the unnecessary connection. In particular, when the Wi-Fi Direct MFP operates as the GO, there is a limitation in the number of wireless devices that may be connected to the MFP, and thus, the connection may be effectively controlled according to embodiments.

FIG. 12 is a flowchart illustrating processes of setting and changing the connection restricted device types by the user. When the user inputs a request for changing the connection restricted device type and the database through the user interface unit (user interface) 13 (S1201), the connection restricted device type setting unit 14 determines whether the user has an authority to change (S1203). The determination of the authority may be performed in a way of log-in by the user through the user interface unit (user interface) 13. If it is determined that the user has the authority to change the device type, the connection restricted device type database is changed according to the request of the user (S1205). At this time, the user may select the device types, the connection of which is wanted to be restricted, among the device types of eleven categories and sub-categories of each of the eleven categories, which are defined by the Wi-Fi Direct, through the user interface unit (user interface) 13.

On the other hand, even if the user does not set the connection restricted device types through the processes shown in FIG. 12, the device type that may not provide any service even when it is P2P connected to the MFP due to characteristics of the device may be set as the connection restricted device type as an initial setting of the MFP. For example, gaming devices or audio devices may not provide any service even when the above devices are P2P connected to the MFP, and thus, device types of the above gaming devices or the audio devices may be set as the connection restricted device types at the initial setting of the MFP.

Figure 13:
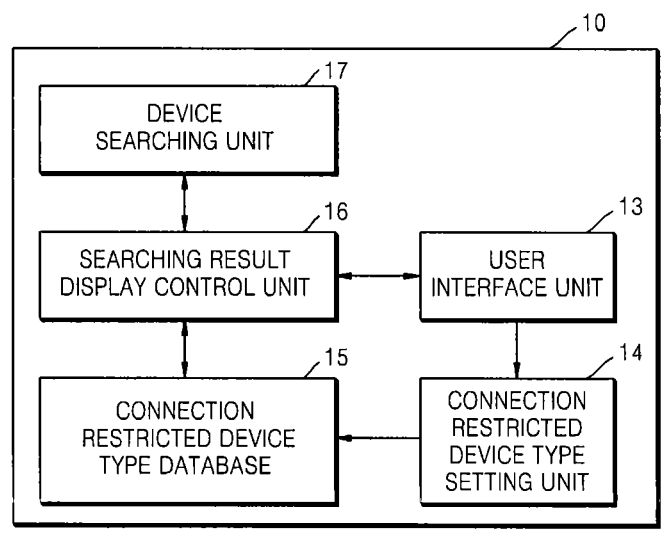
FIG. 13 is a block diagram of a detailed configuration of a multi-function printer supporting the Wi-Fi Direct according to an embodiment.
Figure 14:
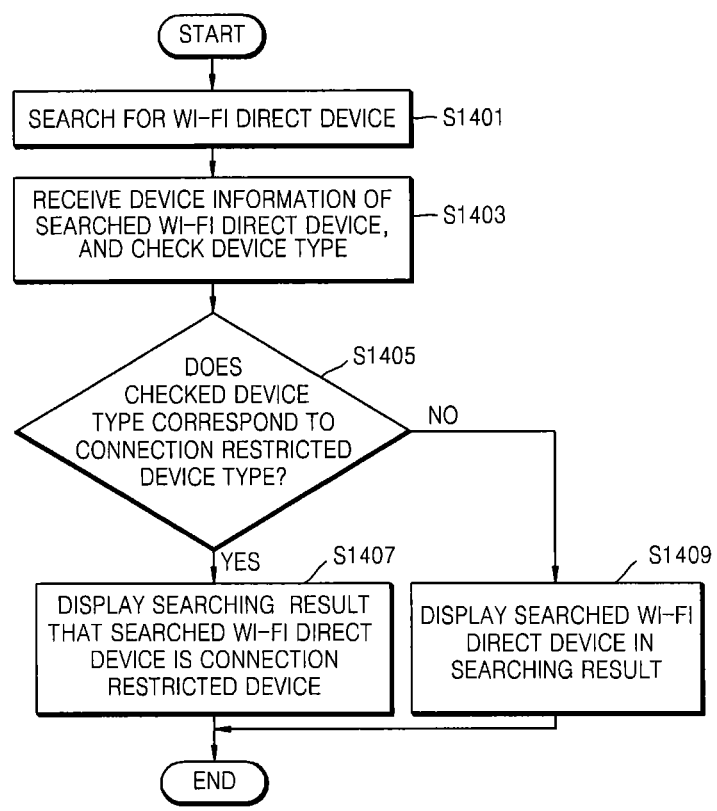
FIG. 14 is a flowchart illustrating a method of controlling a P2P connection of a multi-function printer supporting the Wi-Fi Direct according to an embodiment.

FIG. 13 is a detailed block diagram of a Wi-Fi Direct MFP according to an embodiment, and FIG. 14 is a flowchart illustrating operations of the Wi-Fi Direct MFP of FIG. 13. Referring to FIG. 13, the Wi-Fi Direct MFP 10 of an embodiment may include the user interface unit (user interface) 13, the connection restricted device type setting unit (connection restricted device type setter) 14, the connection restricted device type database 15, a search result display control unit (search result display controller) 16, and a device searching unit (device searcher) 17.

Featured components of the Wi-Fi Direct MFP 10 that are necessary to execute the method of controlling the P2P connection are only shown in FIG. 13 under the assumption that the basic hardware configuration of the Wi-Fi Direct MFP shown in FIG. 8 is included in the Wi-Fi Direct MFP 10. For example, the user interface unit (user interface) 13 of FIG. 13 corresponds to the user interface unit 850 of FIG. 8, the connection restricted device type setting unit 14 of FIG. 13 is included in the CPU 830 of FIG. 8, and the connection restricted device type database 15 of FIG. 13 is a space for storing a list of connection restricted device types in the memory unit 840 of FIG. 8. In addition, the search result display control unit (search result display controller) 16 of FIG. 13 is included in the CPU 830 of FIG. 8, and the device searching unit 17 of FIG. 13 is included in the WLAN interface unit 810 and the CPU 830.

Referring to FIG. 14, the device searching unit 17 searches for wireless devices supporting Wi-Fi Direct (S1401), and when the Wi-Fi Direct wireless device is searched, the device searching unit (device searcher) 17 receives device information of the searched Wi-Fi Direct wireless device and checks the device type (S1403). When the device type is checked, the search result display control unit 16 determines whether the checked device type corresponds to the connection restricted device type (S1405). If the checked device type corresponds to the connection restricted device type, the search result display control unit 16 may display that connection to the corresponding wireless device is restricted when the device searching result is displayed on the user interface unit (user interface) 13 (S1407). Otherwise, the device searching result may be displayed except for the connection restricted wireless devices (S1409).

As described above, when the device searching result is displayed in the MFP, it is notified to the user that there is the wireless device, the connection to which is restricted. Thus, user's convenience may be improved.

FIG. 15 is a diagram showing an example of the user interface for setting the Wi-Fi Direct connection restricted device type. Referring to FIG. 15, devices such as input devices, printers, scanners, faxes and copies, gaming devices, and audio devices are set as the device types, the connection to which is restricted.

Embodiments may be recorded in computer-readable media including program instructions (computer readable instructions) to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While embodiments have been particularly shown and described with reference to the drawings, it will be understood by those of ordinary skill in the art that various changes in form and details may be made therein without departing from the spirit and scope of the present disclosure as defined by the following claims.

What is claimed is:

1. A method of controlling a peer-to-peer (P2P) connection of an image forming apparatus that supports the P2P connection, the method comprising:
receiving in the image forming apparatus a P2P connection request from an external wireless device;
checking a device type of the wireless device by the image forming apparatus;
determining whether the device type is a connection restricted device type;
when the device type is not the connection restricted device type, determining a group owner to operate as an access point (AP) among the image forming apparatus or the wireless device; and
when the device type is the connection restricted device type, blocking a P2P connection to the wireless device by the image forming apparatus, and when the device type is not the connection restricted device type, P2P connecting the image forming apparatus to the wireless device,
wherein the image forming apparatus operates as the AP that allows clients on a wireless local area network (WLAN) to be connected to each other and concurrently operates as a client on the WLAN.

2. The method of claim 1, wherein the receiving of the P2P connection request is performed when the image forming apparatus operates as the AP.

3. The method of claim 1, wherein the determining whether the device type corresponds to the connection restricted device types is performed with reference to a connection restricted device type database that stores a list of the connection restricted device types.

4. The method of claim 3, wherein when a request for changing the connection restricted device type database has been received, a changing operation is performed after checking whether a user who requested the changing of the connection restricted device type database has authority to change the database.

5. The method of claim 1, wherein when the checked device type corresponds to the connection restricted device type, a message representing that a connection is restricted is displayed.

6. The method of claim 1, wherein the connected restricted device type includes one or more devices that do not provide a service to the image forming apparatus.

7. A method of controlling a peer-to-peer (P2P) connection of an image forming apparatus that supports the P2P connection, the method comprising:
searching for wireless devices around the image forming apparatus;
checking a device type of a searched wireless device by the image forming apparatus;
determining whether the device type of the wireless device is a connection restricted device type in the image forming apparatus;
when the device type is not the connection restricted device type, determining a group owner to operate as an access point (AP) among the image forming apparatus or the wireless device; and
displaying a searching result by the image forming apparatus with reference to a result of the determining;
wherein the image forming apparatus operates as the AP that allows clients on a wireless local area network (WLAN) to be connected to each other and concurrently operates as a client on the WLAN.

8. The method of claim 7, wherein the displaying of the searching result includes displaying the searching result except for the wireless device, when the device type of the wireless device is the connection restricted device type.

9. The method of claim 7, wherein the display of the searching result includes displaying that the connection to the wireless device is restricted, when the device type of the wireless device is the connection restricted device type.

10. At least one non-transitory computer readable recording medium storing computer readable instructions that control at least one processor for executing the method according to claim 1.

11. At least one non-transitory computer readable recording medium storing computer readable instructions that control at least one processor for executing the method according to claim 7.

12. An image forming apparatus supporting a peer-to-peer (P2P) connection, the image forming apparatus comprising:
a communication interface unit which connects to an external wireless device in a P2P connection method; and
a communication control unit which checks a device type of the wireless device when a connection request is transmitted from the wireless device through the communication interface, which determines a group owner to operate as an access point (AP) among the image forming apparatus of the wireless device if the checked device type is not a connection restricted device type, which blocks a connection to the wireless device if the checked device type is the connection restricted device type, and which connects to the wireless device in the P2P connection if the checked device type is not the connection restricted device type,
wherein the image forming apparatus operates as the AP that allows clients on a wireless local area network (WLAN) to be connected to each other and concurrently operates as a client on the WLAN.

13. The image forming apparatus of claim 12, wherein the communication interface unit receives the connection request from the wireless device when the image forming apparatus operates as the AP.

14. The image forming apparatus of claim 12, further comprising a connection restricted device type database that stores a list of the connection restricted device types.

15. The image forming apparatus of claim 14, further comprising:
a user interface unit which receives a request for changing the connection restricted device type database from a user; and
a connection restricted device type setting unit which changes the connection restricted device type database after checking whether the user has an authority to change the database when the user interface unit receives the request for changing the connection restricted device type database from the user.

16. The image forming apparatus of claim 12, further comprising a user interface unit which displays a processing result of the connection request transmitted from the wireless device,
wherein the communication control unit displays a message representing that the connection is restricted through the user interface unit when the device type is the connection restricted device type.

17. An image forming apparatus supporting a peer-to-peer (P2P) connection, the image forming apparatus comprising:
a device searching unit which searches for wireless devices around the image forming apparatus, and checking a device type of a searched wireless device; and a searching result display control unit which determines whether the device type of the wireless device is a connection restricted device type, which determines a group owner to operate as an access point (AP) among the image forming apparatus or the wireless device if the determined device type is not a connection restricted device type, and which displays the searching result of the wireless device through the user interface with reference to the determination result, wherein the image forming apparatus operates as the AP that allows clients on a wireless local area network (WLAN) to be connected to each other or operates a client on the WLAN.

18. The image forming apparatus of claim 17, wherein the searching result display control unit does not display the wireless device in the searching result, when the device type of the wireless device is the connection restricted device type.

19. The image forming apparatus of claim 17, wherein the searching result display control unit displays that the connection to the wireless device is restricted, when the device type of the wireless device is the connection restricted device type.

* * * * *